F. B. CARLISLE.
CASING FOR PNEUMATIC TIRES AND PROCESS OF MAKING SAME.
APPLICATION FILED JULY 31, 1919.
1,345,998.
Patented July 6, 1920.
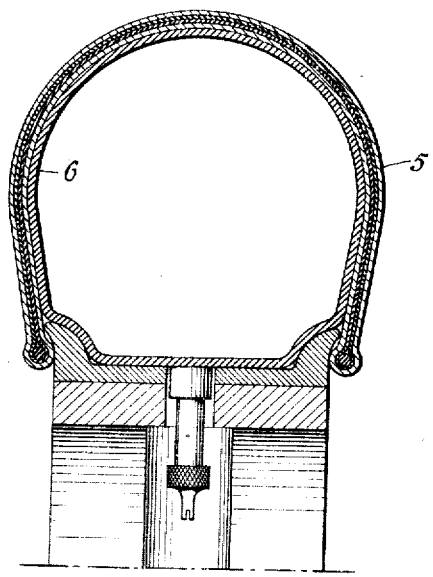
WITNESSES
INVENTOR
Fred B. Carlisle
BY
ATTORNEY

UNITED STATES PATENT OFFICE.

FRED B. CARLISLE, OF ANDOVER, MASSACHUSETTS, ASSIGNOR TO JOSEPH M. GILBERT, OF NEW YORK, N. Y.

CASING FOR PNEUMATIC TIRES AND PROCESS OF MAKING SAME.

1,345,998.   Specification of Letters Patent.   Patented July 6, 1920.

Application filed July 31, 1919. Serial No. 314,433.

*To all whom it may concern:*

Be it known that I, FRED B. CARLISLE, a citizen of the United States, and resident of Andover, county of Essex, State of Massachusetts, have invented certain new and useful Improvements in Casings for Pneumatic Tires and Processes of Making Same, of which the following is a specification.

My invention relates to pneumatic tires and more particularly to that type thereof in which cord layers replace the customary fabric layers. The object of my invention is the production of a novel casing for such pneumatic tires and the provision of a novel process whereby such casings may be made. Other more specific objects will appear from the description hereinafter and the features of novelty will be pointed out in the appended claims.

For the purpose of illustrating and describing the invention, a diagrammatic cross-sectional view of the casing at one stage of the construction is shown in the accompanying drawing.

The present invention is most closely identified with casings which at one stage of the manufacture comprise a carcass of substantially cylindrical form. This carcass is amplified to include all of the elements and features which are intended to form part of the finished casing, it being understood that the physical characteristics of all of the elements constituting the carcass, at this stage, are such as to render said elements capable of being united in the form of a homogeneous mass by vulcanization. In order that the finished casing may be vulcanized in the proper shape, the carcass is preliminarily shaped either before or after the above mentioned amplification has taken place.

According to the present invention, this preliminary shaping is accomplished by placing the substantially cylindrical carcass 5 upon a collapsed air bag 6 which is then inflated under a pressure of approximately 50 to 60 pounds. As the air bag 6 is inflated the intermediate portions of the carcass will be bulged outwardly and the edge portions thereof, which are preferably left free to assume any position to which the strains produced by the inflation of the air bag may move them, will be drawn toward each other to bring the parts to approximately the positions shown diagrammatically in the drawing. In this condition the carcass is ready for the vulcanization process; ordinarily the latter would destroy the usefulness of the air bag and require the same to be discarded after vulcanization of the carcass had been completed. To overcome this destruction of the usefulness of the air bag and to avoid the waste of material incident thereto, the air bag 6 is used in a condition in which its physical characteristics are such that it will become combined with the carcass by vulcanization and thus become a useful homogeneous part thereof. To accomplish this, the material of which the air bag 6 is constructed may be either semi-cured or entirely uncured so that after it has been used to distend the carcass as hereinbefore set forth, and is subjected therewith to the vulcanization process, the latter instead of destroying its usefulness, will combine it with the carcass as an inner lining, which otherwise would be composed of an individual element added to the carcass at the proper time. The present invention therefore not only converts the air bag into an integral part of the carcass, but also saves the material which ordinarily would be required for the lining.

After the vulcanizing has been completed, those parts of the air bag which transversely bridge or span the space between the bead edges of the casing are trimmed away, thus leaving the remainder of said air bag within the casing as an integral part thereof.

The invention results in a considerable saving of material and renders useful what otherwise would become waste and at the same time provides a superior product because of the fact that the air bag, in performing its functions as a core, being necessarily in intimate contact with the interior of the carcass, is converted into a lining which is uniform and smooth throughout and free from folds, creases and the like, which if present, subject the inner tube to undue wear when the tire is in active use.

While the invention is specially adapted for use in manufacturing cord tires, it may also be found useful in connection with pneumatic tires of other types.

Various changes in the specific form shown and described may be made within the scope of the claims without departing from the spirit of my invention.

I claim:

1. The process of making casings for pneumatic tires which consists in constructing a carcass, supporting said carcass upon a core and combining said core with said carcass by vulcanization.

2. The process of making casings for pneumatic tires which consists in constructing a carcass, shaping said carcass by means of an air bag and vulcanizing the carcass and coincidentally combining the air bag therewith by said vulcanization.

3. The process of making casings for pneumatic tires which consists in constructing a substantially cylindrical carcass, shaping said carcass by means of an air bag, vulcanizing the carcass and coincidentally combining the air bag therewith by said vulcanization and removing those portions of the air bag which transversely span the space between the bead edges of the casing.

4. The combination of a casing and a vulcanized rubber lining forming an integral part thereof, the circumferential edges of said lining being located inwardly from the circumferential bead edges of the casing and said edges of the lining having the surface characteristics of vulcanized rubber where severed by a cutting implement.

In testimony whereof I have hereunto set my hand.

FRED B. CARLISLE.